Dec. 17, 1968    D. C. CLINE ET AL    3,416,692
SHIPPING CONTAINER
Filed July 1, 1964
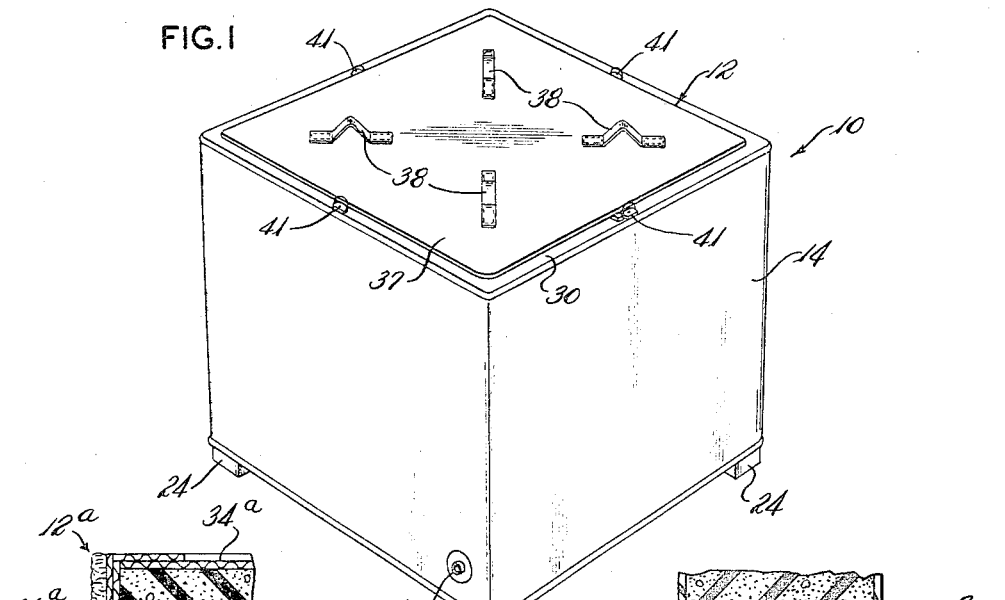
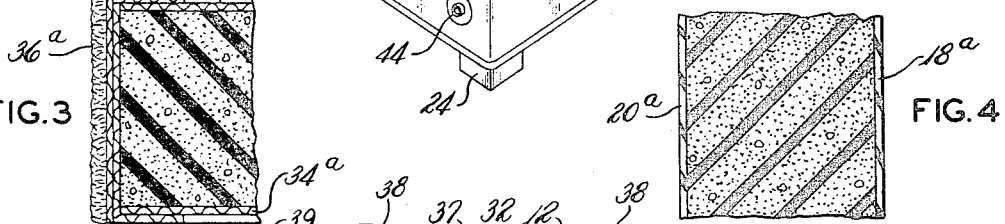
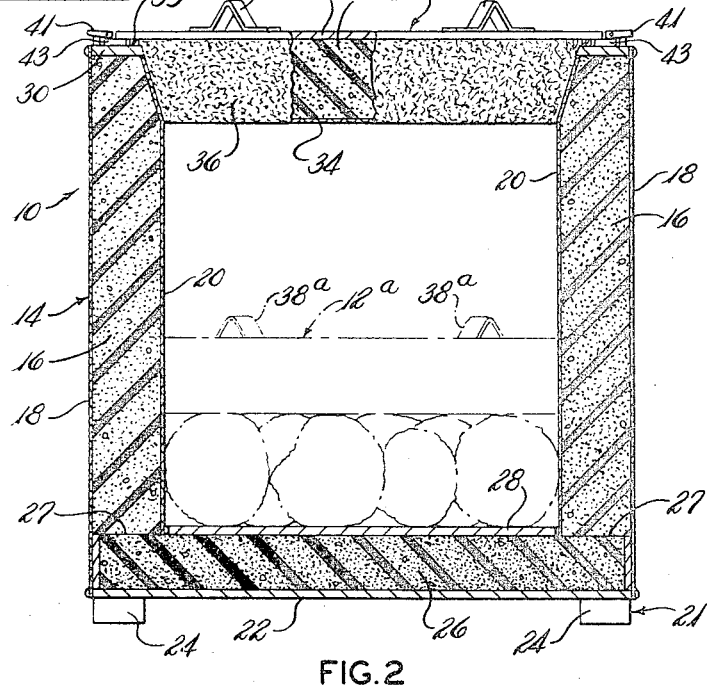

United States Patent Office 3,416,692
Patented Dec. 17, 1968

3,416,692
SHIPPING CONTAINER
Delbert Charles Cline, San Pedro, and George Bowman Harr, Pasadena, Calif., assignors to The Firestone Tire & Rubber Company, Akron, Ohio
Filed July 1, 1964, Ser. No. 379,495
5 Claims. (Cl. 220—9)

This invention relates to containers, and more particularly to insulated shipping containers well-suited for cold storage.

In the shipment and handling of commodities in which it is desired to maintain the commodities at specific temperature levels regardless of various ambient temperatures, a problem exists relative to adequate containers. Rigid, non-collapsible and knock-down containers, unless excessively heavy, have been unsatisfactory due to damage incurred from the rough handling to which they are subjected. Heretofore, attempts to provide an inexpensive, light-weight, durable container having satisfactory insulating qualities have been unsuccessful.

The present invention solves these and other problems by providing a semi-rigid, but self-supporting, insulated shipping container having walls composed of elastomeric foam material encapsulated within a flexible casing or membrane. These walls are usually fabricated integrally with a load-supporting, insulated pallet-like base susceptible of being handled with normal equipment, such as fork lifts, hand dollies or by hand.

The present invention provides a container that may be severely distorted but which restores itself to its original shape by virtue of the resilience and internal energy of the composition of the walls. Containers fabricated according to this invention may be distorted until opposing walls touch each other; the container may indeed be stretched or twisted, and yet it returns to its original shape when the externally applied forces are removed. These characteristics of self-initiated return to original shape are particularly important with respect to insulated containers, insofar as it is mandatory that such containers retain their thermal integrity by virtue of tight joints and lid-closures. The lid-closures and wall joints of this container remain completely functional throughout the life of the container due to the above described flexible yet self-aligning properties.

Another highly desirable feature of this container is the capability of the wall structure to return to full thermal efficiency after being damaged, for example by some piercing or compressing object. This property is again related to the flexibility due to self-contained energy of the elastomeric insulated materials utilized in the walls of the container. Furthermore, the outer casing or membrane of the subject containers may be easily repaired by means of adhesive tape, tube-patching equipment, etc.

The containers embodied in this invention are light weight and are constructed in a fashion to enhance cleaning, to preclude the deleterious effects of moisture entering the insulation, etc. These containers lend themselves to a variety of sizes and shapes, and are found useful for less-than-truckload or less-than-carload shipments. These containers have been found useful in the instance of mixed shipments at various temperature levels, e.g. one temperature appropriate to a particular commodity may be maintained within the semi-rigid container concurrently with a different temperature appropriate to another commodity within an insulated van or other type of vehicle.

It is therefore the object of this invention to provide an improved insulated shipping container.

Another object is to provide a highly durable, thermally efficient, light weight, flexible, self-healing, and inexpensive shipping container.

Another object is to provide such a container wherein the insulating medium is effectivey shielded against the deleterious effects of moisture.

Another object is to provide an insulated shipping container which is readily cleanable, this characteristic being important in the handling of foodstuffs.

Another object is to provide a container which is highly useful for handling commodities where two or more temperature levels must be maintained.

A still further object is to provide a container which is highly useful for less-than-truckload and less-than-carload shipments.

Another object is to provide an insulated container having means to maintain the insulated volume at a minimum in relation to the contents.

Another object is to provide an insulated container having an insulated cover that is adapted to slide within the container to rest on the contents therein, to maintain a minimum necessary insulated volume.

Another object is to provide a flexible container having elastomeric foam material in the walls and having means to selectively vent said walls.

These and other objects will become more apparent by reference to the following specification and drawing, in which:

FIGURE 1 is a perspective view of the container of the invention;

FIGURE 2 is a sectional view of the container of FIGURE 1;

FIGURE 4 is an enlarged, fragmentary, sectional view a modification of one of the wall structures of the container;

FIGURE 3 is an enlarged, fragmentary, sectional view of a modified form of the lid of the container.

Referring now to the drawings, a container is indicated generally by the numeral 10, having a cover or lid 12. The container 10 is comprised of vertically extending walls 14 defining a storage compartment and comprising resilient, insulating foam material 16 having a flexible, substantially fluid-impervious casing on the outer and inner sides. The casing may comprise a coated fabric shown at 18 and 20, FIGURE 2; or a non-fabric elastomer or plastic film or membrane shown at 18a and 20a, FIGURE 4.

The foamed inslulating material 16 is preferably of the interconnected, open-cell type; with this type of foam (for example, polyurethane) the interstices between cells effectively prevent circulation of air from the cold (inside) side to the warm (outside) side of the container. In order to provide for pressure equalization during travel between locations of differing altitudes, a normally open valve 14 is located in one of the walls 14 of the container.

The walls 14 are supported and suitably secured to an insulated, pallet-like base structure 21, havinge legs 24. The insulated base-structure 21 more particularly includes a base plate 22 supporting, in turn, a slab of foamed insulating material 26 to which the side-walls 14 are secured at 27. A floor panel 28 may be provided at the bottom of the enclosure, on top of the slab 26, to provide additional structural rigidity. Also, there may be provided a border plate 30 at the top ends of the walls 14 to provide stability thereto.

The cover 12 is preferably comprised of a slab of foaming insulating material 32 and is shown covered with a coated fabric casing 34 and attached to a panel 37 extending out over the border plate 30 of the container. Panel 37 serves to prevent entry of water into the container, and the panel may therefore be provided with a compressible seal-strip 39 to effect a positive seal. Means may be provided for seating and locking the cover in place within the top of the container, one such means comprising a pivotally-mounted fastener 41 mounted on the border plate 30 and acting on an extension 43 of the panel 37. The slab 32 of insulating material is shown tapering inwardly and the upper inner edge of the wall 14 is correspondingly relieved to mate with this tapered portion; a strip 36 of nappy material is provided around the peripheral face of slab 32 to provide a gasket-like insulating seal between the cover and the inner periphery of the container. Suitable handles or loops 38 may be provided for manipulation of the cover.

A modified lid 12a is shown in FIGURE 3 and in position in dotted lines in FIGURE 2; it comprises a slab 32a of insulating, foamed material having a covering 34a and nappy material 36a. The cover 12a comprises side walls mating with the inner periphery of the container. As seen in FIGURE 2, this mating provides for the cover to slide vertically within the container to rest on the contents, thus maintaining minimum necessary insulated volume. Suitable handles or loops 38a are provided for manipulation of the cover.

What is claimed is:

1. An insulated shipping container comprising a rigid base, wall means supported on said base, and an insulated cover cooperating with said wall means, said base, wall means and cover together forming an insulated storage compartment, said wall means comprising a foamed, resilient, flexible, elastomeric, open-cell insulating member enclosed between substantially fluid-impervious coverings, said foamed material having an elastic memory returning it to its original configuration upon release from distortion, said base comprising a foamed, resilient, flexible, elastomeric, open cell insulating member laminated between substantially rigid and fluid-impervious upper and lower face coverings.

2. The container of claim 1 in which the covering is a sprayed-on membrane.

3. The container of claim 1 in which the covering is substantially gas-impervious elastomer-coated fabric.

4. The container of claim 1 the base of which constitutes a pallet.

5. The container of claim 1 having within it a storage space bounded by six rectilinear surfaces.

References Cited

UNITED STATES PATENTS

| | | | |
|---|---|---|---|
| 3,160,307 | 12/1964 | Morrison | 220—9 |
| 2,216,830 | 10/1940 | Roberts | 220—9 |
| 2,338,455 | 1/1944 | Petri | 220—16 X |
| 2,552,641 | 5/1951 | Morrison | 220—9 |
| 2,962,183 | 11/1960 | Rill, et al. | 220—9 |
| 3,049,261 | 8/1962 | Wade et al. | 220—26 |
| 3,093,259 | 6/1963 | Morrison | 220—9 |
| 3,158,667 | 11/1964 | Michaels | 220—26 X |
| 3,190,442 | 6/1965 | Gauss | 206—46 |
| 3,255,936 | 6/1966 | Healy et al. | 220—93 |
| 3,302,815 | 2/1967 | Morrison | 220—9 |

FOREIGN PATENTS

| | | |
|---|---|---|
| 1,210,324 | 9/1959 | France. |
| 1,334,495 | 7/1963 | France. |

MARTHA L. RICE, *Primary Examiner.*

J. R. GARRETT, *Assistant Examiner.*

U.S. Cl. X.R.

220—93; 206—46